United States Patent

[11] 3,552,618

[72] Inventor John A. Molnar
Fairfield, Conn.
[21] Appl. No. 775,295
[22] Filed Nov. 13, 1968
[45] Patented Jan. 5, 1971
[73] Assignee Wiltek, Inc.
Wilton, Conn.

[54] TAPE HANDLING AND STORAGE APPARATUS
15 Claims, 3 Drawing Figs.

[52] U.S. Cl. ........ 226/25, 226/50, 226/118, 226/196, 226/85; 179/100.2
[51] Int. Cl. ........ G11b 15/04
[50] Field of Search ........ 226/108, 196, 82, 83, 84, 85, 86, 50, 25, 118, 119; 179/100.2

[56] References Cited
UNITED STATES PATENTS

| | | | |
|---|---|---|---|
| 2,560,918 | 7/1951 | Bedford et al. | 226/85X |
| 2,560,919 | 7/1951 | Bedford | 226/85X |
| 3,148,815 | 9/1964 | Jung | 226/50 |
| 3,358,892 | 12/1967 | Johnson et al. | 226/85 |
| 3,439,852 | 4/1969 | Blodgett | 226/84X |

*Primary Examiner*—Allen N. Knowles
*Attorney*—Robert A. Buckles

ABSTRACT: A tape handling mechanism and horizontal storage bin for a continuous loop of magnetic tape includes slotted tape guides positioned at critical angles to achieve a smooth and uniform passage of tape from the bin onto a pair of separately operable sprocket drives, past read and write heads tangential to the sprocket drives, and from the sprocket drives back into the bin, while preventing gripping or jamming of the tape loop in the confined bin. A pair of tape guide slots between the read and write heads guides tape into a buffer loop whenever data is recorded by the write head more rapidly than recorded data is read out by the read head. A first tape tension switch operates when the buffer loop is too tight, to cause the write head sprocket to advance tape without recording data, while a second tape tension switch prevents further operation of the recording head sprocket when the buffer store is completely filled.

INVENTOR
John A. Molnar
BY
Robert A. Buckles
ATTORNEY

TAPE HANDLING AND STORAGE APPARATUS

BACKGROUND OF THE INVENTION

The invention relates to improved tape handling and tape storage means for incremental tape recorders of the type used for recording digital information, for example, in telegraphic communication systems, digital data collection and transmission systems, and the like. Such incremental tape recorders may also be used in association with a typewriter to produce a machine language record of what is being typed. The tape thus recorded may then be "played back" to operate an electric typewriter to print out the typed copy. In such applications it is necessary that the incremental recorder be able to back space, that is to back up and correct the recorded character, if an error is made in typing. Furthermore, provision must be made for recording data at one rate and reading it out at a different rate, as for example, where the data may be recorded from a high speed computer and subsequently read out to a lower speed print out device. For this purpose a buffer storage loop must be provided between the recording or "write" head and the playback or "read" head. A system for this purpose is disclosed in W. R. Smith-Vaniz et al. U.S. Pat. No. 3,357,002 issued Dec. 5, 1967, while a tape transport for an incremental tape recorder is disclosed in J. R. Montgomery U.S. Pat. No. 3,370,283 issued Feb. 20, 1968, with a preferred motor control disclosed by W. R. Smith-Vaniz in U.S. Pat. No. 3,386,018 issued May 28, 1968, and a synchronizing incremental drive disclosed by W. R. Smith-Vaniz in U.S. Pat. No. 3,405,402 issued Oct. 8, 1968, all of which patents are assigned to the same assignee as the present application.

In these prior art systems, the buffer store tape bin was arranged vertically to allow a long loop of tape to hang down from the tape transport mechanism. This vertical storage bin for a long loop tape has a number of disadvantages, one of which is that as different lengths of folded tape loops rub against each other, while hanging vertically under the influence of gravity, the static electricity generated by frictional engagement between adjacent portions of tape causes the loops to cling together and to tend to jam at the tape transport mechanism. Another, and perhaps even more serious, disadvantage is that the vertical bin requires a great deal of valuable space which might otherwise be used for the placement of other electrical or communications equipment, or for cabinet storage of other materials.

Therefore a principal object of the present invention is to provide practical means for storing a long continuous loop of data tape in a shallow horizontal tray, with space for the electronic circuit board and the necessary associated equipment immediately beneath the tape tray, so that the entire unit may be slid horizontally into the front of a standard 19-inch communications rack wherein the entire vertical space requirement is less than 6 inches. Thus, by the present invention a number of discrete digital tape recording units may be stacked vertically one on top of another in a communications rack to accommodate a larger volume of data storage and to serve a greater number of machines, if desired. If only one such data storage unit is needed, it may be mounted on a desk or table top, or in a 19-inch vertical communications rack with other communications gear mounted in the same supporting rack.

In the horizontal tape storage device of the invention the problem of intersurface static electricity between adjacent loop portions is further complicated by the additional friction of the tape edges against the horizontal shelf on which they must rest. This necessitates the provision of more accurate and more carefully controlled tape guiding means for feeding the tape loop into the recording head sprocket drive, thence from the first sprocket drive back into the storage bin in a buffer storage loop, and from there back into the second sprocket drive for the magnetic read out, and from this position back again into the horizontal bin. This complex tape handling must be accomplished without causing any creases or sharp folds in the tape and also without imposing any excess stress on the tape either in compression or in tension as it passes from the bin through the two tape transports and back again into the bin. The present invention accomplishes these objectives, thereby enabling a closed loop of from 50 to 100 feet of data storage magnetic tape to be accommodated in a shallow horizontal tray of less than 19 inches × 20 inches in a horizontal plane.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which.

DETAILED DESCRIPTION

Figure 1:
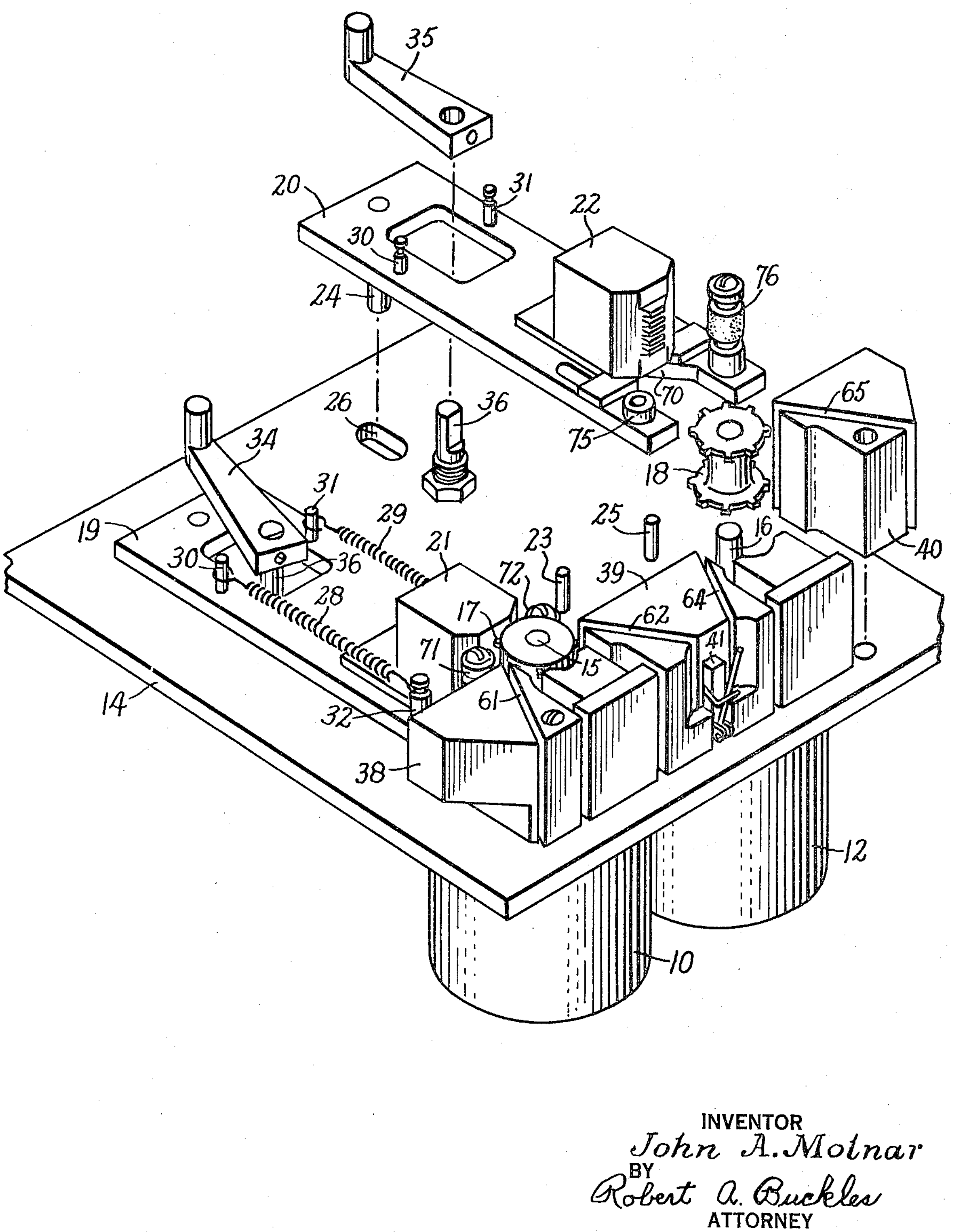
FIG. 1 is a perspective view, partially exploded, of the tape handling and guide means of the invention.

Referring now in greater detail to FIG. 1 of the drawings, the tape drive and transport mechanism comprises a pair of independently operable stepping motors 10 and 12 which are mounted on a horizontal base plate 14 and which have rotatable drive shafts 15 and 16 respectively. Dual sprocketed drive wheels 17 and 18 are respectively mounted on each of the drive shafts 15 and 16. Horizontally slidable plates 19 and 20 carry magnetic transducer heads 21 and 22 respectively. Each of the movable plates 19 and 20 is confined to limited linear motion by a plurality of pins such as 24 and 25 which engage linear slots such as 26 and 27 as shown in the upper portion of the exploded view of FIG. 1. Each of the transducer carrying plates 19 and 20 is also provided with a pair of tension springs such as shown at 28 and 29 in the lower portion of the perspective view in FIG. 1. One end of the springs 28 and 29 is anchored to the sliding plate 20 by being affixed to pins 30 and 31 staked into the upper surface of plate 20, while the opposite ends of these springs are secured to pins such as 32 which passes through a linear slot in the plate 20 and is staked into the upper surface of base plate 14. Pin 23 which passes through slot 27 in the exploded upper portion of FIG. 1 corresponds in all respects to pin 32 in the assembled lower portion of FIG. 1, and a spring similar to spring 28 in the assembled portion (but not shown in the exploded view) is stretched between pin 23 and pin 30. The springs 28 and 29 normally maintain the transducer head 22 in intimate contact with the magnetic coated surface of a data tape passed around sprocket 17. A pressure pad (not shown in FIG. 1) carried by a strap spring support located within the central annular recess of each of the sprocket wheels 17 and 18 presses the magnetic tape firmly against the magnetic heads 21 and 22 in the manner described in detail in the aforementioned U.S. Pat. No. 3,370,283 of J. R. Montgomery. Bell cranks 34 and 35 are affixed to cam shafts such as 36 which pass through the base plate 14 and operate cams (not shown) to move the transducer carrying plates 19 and 20 against the tension of springs 28 and 29 thereby sliding the transducers away from proximity with the sprocket wheels 17 and 18 when it is desired to load or unload tape from the machine. The construction and operation of these cams is well disclosed in the aforesaid patent of J. R. Montgomery.

The sprocketed tape is threaded through precisely positioned slots 61, 62, 64 and 65 formed in guide blocks 38, 39 and 40, as seen in FIG. 1 of the drawings. A "tight tape" microswitch 41 mounted in association with central guide block 39 serves to issue instructions to the recording motor to advance tape without recording whenever the buffer loop which passes over switch 41 is too tight. It is to be understood that the two sections of the tape handling apparatus as illustrated in FIG. 1 of the drawings, the lower section being shown assembled in place and the upper section exploded, are identical in all respects and either one may be used for recording data or for reading out data. Thus the tape loop may be moved either from left to right or from right to left depending upon the manner in which the control circuits are connected.

Figure 2:
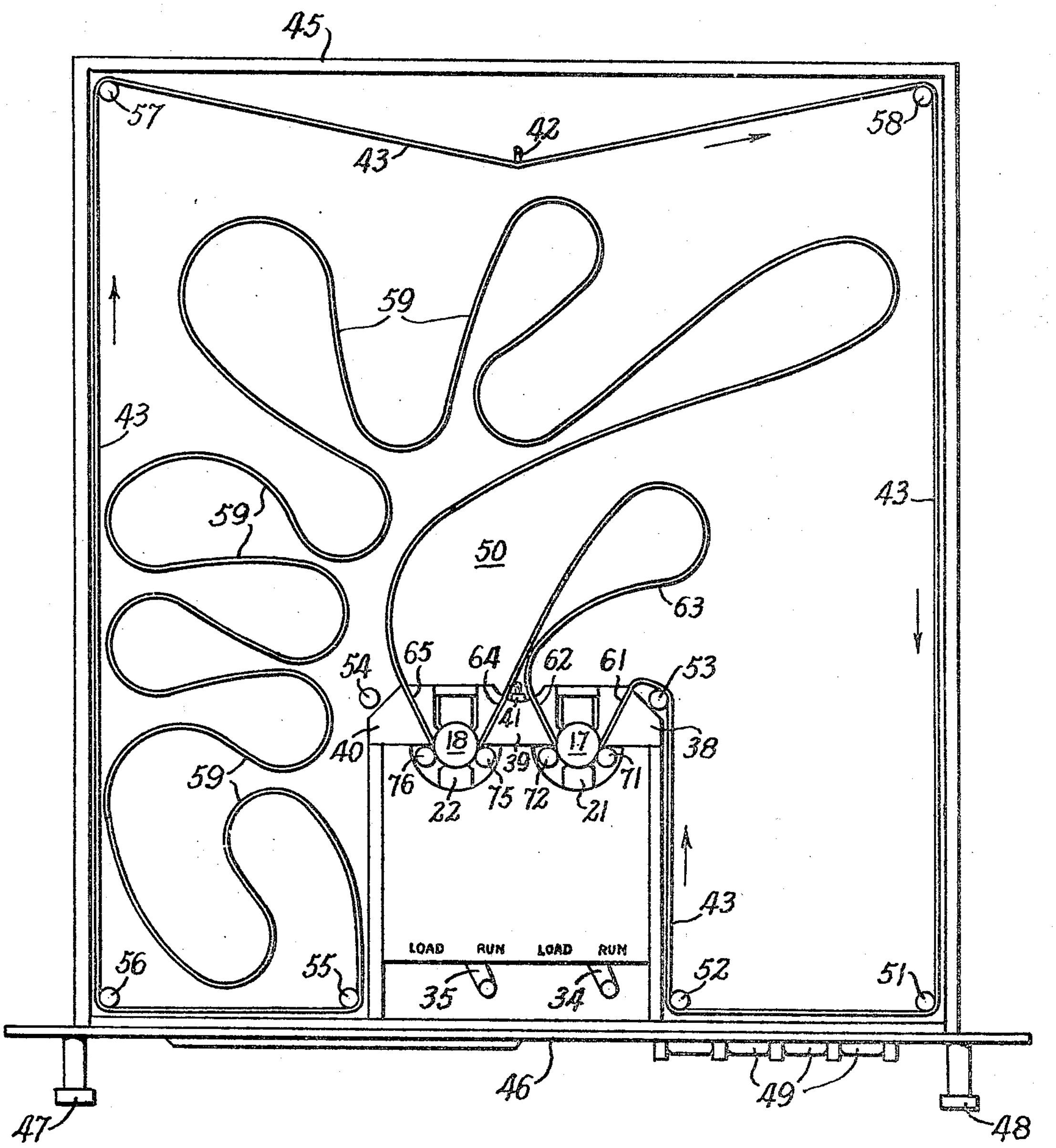
FIG. 2 is an overall plan view of the assembled tape handling apparatus, showing a continuous loop of tape stored therein.

The manner in which the closed loop of magnetic tape is passed through the two sections of the tape handling apparatus, and the manner in which the long loop is accommodated within the confines of a small tray is illustrated by FIG. 2 which is a top plan view of the complete tape deck as loaded with a long continuous loop of magnetically coated tape 43. In FIG. 2 it may be seen that the tape deck comprises a substantially square rectangular tray 45, having a front panel 46 which carries a pair of handles 47 and 48 by which the entire assembly may be inserted horizontally into a standard communications rack, or into a suitable enclosing case (not shown) if the apparatus is to be mounted on a desk or table top. The front panel 46 also carries a plurality of mode selecting and operating switches, or push buttons, 49 by which the operator starts and stops the device or selects a mode of operation, i.e., whether from left to right or vice versa. The electronic circuits for the control of input and output information are mounted on printed circuit boards installed beneath the top plane surface 50 of the tray 45. This circuitry is the subject of the aforesaid patents to W. R. Smith-Vaniz and does not represent a part of the present invention. The tray 45 need only be deep enough to accommodate the width of the data tape, hence there is ample space beneath the surface 50 of the tray 45 to accommodate all of the electronics needed. In the preferred embodiment the data is recorded on magnetically coated 16 millimeter plastic film, and the depth of the tray is less than one inch. Eight tape guide rollers, 51 through 58, are provided within the tray, one such roller being located at each of the corners about which the tape loop must pass. Two additional pairs of tape guide rollers, 71–72 and 75–76, are provided in the tape handling and driving mechanism, one pair adjacent opposite sides of each of the two sprocket wheels 17 and 18, as will be described in greater detail with reference to FIG. 3 hereinafter.

The convolutions of tape, 59, as depicted in FIG. 2 illustrate that the tape loop is advancing in the direction of the arrows, from right to left in this view. That is to say, the tape 43 is being drawn in the direction of the arrows from the right-hand side of the tray, around rollers 51, 52 and 53, through slot 61 in guide block 38, around sprocket 17, through exit slot 62 of guide block 39 into a buffer loop 63, which passes around the "tight tape" microswitch 41, thence back into the tape driving mechanism through guide slot 64 in guide block 39, around sprocket wheel 18 and out through slot 65 in guide block 40. From this point on the tape loop writhes in irregular convolutions 59 without engaging idler 54, thence around idler rollers 55, 56 and 57, past a second microswitch 42 and around corner idler 58 to complete the closed loop.

Still referring to FIG. 2, it is to be understood that in the mode of operation here illustrated, wherein the tape moves from right to left in the direction of the arrows, the right-hand transducer 21 is operated in the recording mode wherein successive data bits are recorded onto the tape and then incrementally advanced into the buffer storage loop 63. Thus intermittent bits of data can be accumulated over an extended period of time, to the full extent of the capacity of the long loop, and then subsequently this data may be read out by actuation of the lefthand tape drive mechanism 18, with the recorded signals being read out by transducer 22. By this means intermittent data accumulated on the buffer storage loop 63 may be transmitted at high speed into a computer or other retransmission equipment. The apparatus may be employed to record low-speed data in, and high-speed data output, with the speed difference being taken up by outputting data in bursts. The input and output sections of the apparatus may be operated simultaneously, or concurrently, without being operated in synchronism. If the data is to be outputted to a lower speed device such as a printer, it may be recorded by the recording transducer 21 at a higher speed input, stored in the buffer loop 63 and read out by the output transducer 22 at slower speed compatible with the output printing device. As the length of buffer storage loop 63 increases, the number and length of convolutions 59 will decrease until such time as the buffer store loop 63 substantially fills the tape tray and the output loop becomes tight against idle roller 54 on the left as viewed in FIG. 2. Tightening of the output loop in this manner by filling of the buffer storage loop ultimately may produce sufficient tension on microswitch 42 to signal the condition of full buffer store and to either stop the recording operation or automatically commence readout operation. If an additional buffer storage machine is available, either the input signals or the readout may be automatically transferred to a second machine, through operation of microswitch 42. Similarly, if the buffer store is completely read out before additional input data is recorded, the shortened buffer store loop 63 then engages microswitch 41 to initiate the generation of tape leader impulses which cause sprocket wheel 17 to advance tape through the right-hand portion of the tape transport without recording data thereon.

Figure 3:
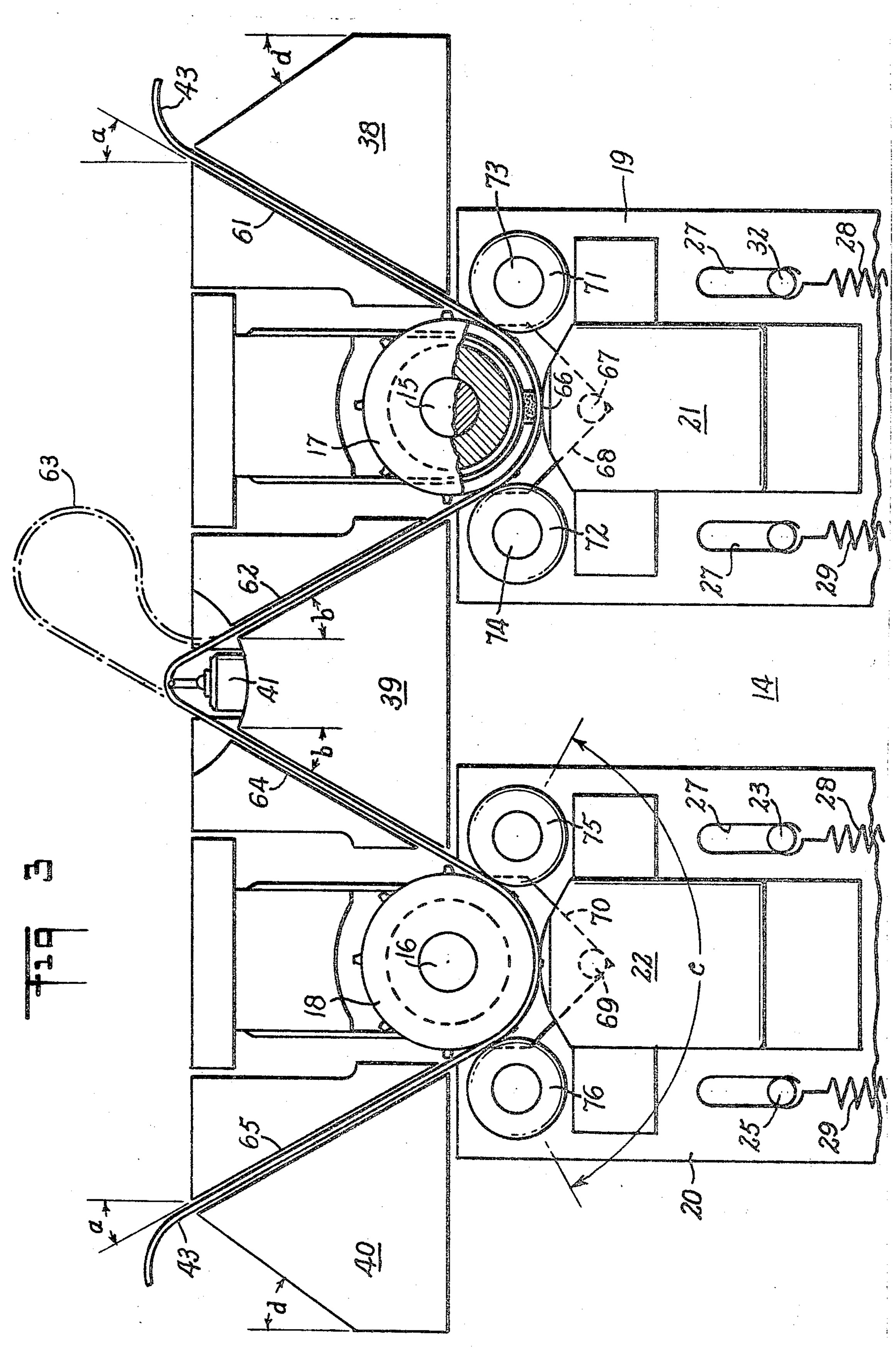
FIG. 3 is an enlarged top plan view of the tape transport showing the critical angles of the tape guiding means.

Reference is now made to FIG. 3 of the drawings which is an enlarged top plan view of the dual head tape transport mechanism showing in detail the manner in which the tape 43 is passed through entrance slot 61 in guide block 38 at the right-hand portion of the device, around the first sprocket wheel 17, thence out through guide slot 62 in central guide block 39, into a buffer loop 63 within the tape storage bin, past microswitch 41, back into tape entry guide slot 64 in central guide block 39, around sprocket wheel 18 and back out through exit slot 65 in guide block 40 into the tape storage bin. Because it is essential that the tape 43 be free at all times to move rapidly, positively, and accurately through this tortuous route, without appreciable tape stretching, the dimensions and angular displacement of the entrance and exit guide slots 61, 62, 64 and 65, the extent of tape wraparound on the sprocket wheels 17 and 18, and the angular displacement and spacing of the tape guide rollers 71–72 and 75–76 adjacent to the sprocket wheels 17 and 18 are all quite critical. These relationships, which are shown in FIG. 3, will now be described in detail.

Still referring to FIG. 3, a pair of free running tape guide rollers 71 and 72 are mounted on vertical shafts 73 and 74 which are adjustably affixed to the slidable plate 20 adjacent to but spaced from the periphery of sprocket wheels 17 when the tape drive mechanism is in the run position as shown in FIG. 3. Rollers 71 and 72 serve to hold the magnetic tape 43 in engagement with the sprocket wheel 17 throughout the angle *c* forming an arc of 123° to 124° of the periphery of sprocket wheel 17. This angular degree of tape wraparound has been found to be optimum as a result of much testing with different tape handling designs. Any greater amount of tape wraparound produces excessive friction and drag through engagement and disengagement of the sprockets with the sprocket holes on the edges of the tape, while any lesser degree of wraparound has been found to be unsatisfactory because of the lack of positive assurance of the required minute incremental motion of the tape as it is rapidly advanced laterally for precise recording and readout of digital data bits. This critical angle, which has been designated *c* in the lefthand section of FIG. 3 is the arc about the central axis of sprocket wheel shaft 16 measured between the points at which the tape idler rollers 75 and 76 are tangential to the tape surface. The tape also is tangential to the sprocket wheel at these positions. To prevent the magnetic tape from buckling or jamming at the points where it becomes tangential to the sprocket wheels and the adjacent idler wheels, the tape is fed into this position through narrow slots 61, 62, 64 and 65, having parallel sidewalls, spaced 0.03125 inch apart, formed in rigid guide blocks 38, 39 and 40. The angles which these slots bear to the vertical as shown in FIG. 3 have also been found to be quite critical in order to avoid subjecting the tape to too sharp a bend at the point of entry to the slots, and to assure straight line tape feeding to the point of tangency between the sprocket wheels and the adjacent idlers.

The guide blocks 38, 39 and 40 are preferably formed of a plastic material compatible with but somewhat harder than the plastic tape which is passed through the slots in the three guide blocks. These guide blocks may be formed of nylon but I prefer to use another duPont product marketed under the trademark DELRIN which is a more machinable plastic. All machined surfaces of the guide blocks must be completely free of burrs, and if the plastic guide blocks are formed by molding, then the slots and other surfaces coming in contact with the tape must be free of flashing.

Still referring to FIG. 3 of the drawings, the angle *a* at which the right and lefthand slots 61 and 65, through guide blocks 38 and 40 respectively, form with a line normal to the point of tangency 66 between the tape 43 and the recording head 21 is preferable 28 ½°, while the corresponding angle *b* at which central slots 62 and 64 are formed is slightly less, preferably 28°. The external angle *d* as shown in FIG. 3 is not so critical but may be in the range of 30° to 60° and in the preferred embodiment illustrated is actually 40°. As shown in broken lines in the right-hand section of FIG. 3, the recording transducer 21 is accurately and precisely located in its recording position, tangent to the tape 43 at point 66, by means of a rigid centering pin 67 which is affixed to the base plate 14 and which engages the corner of a 90° notch 68 formed in the transducer mounting plate 19. An identical pin 69 engages a corresponding notch 70 in transducer mounting plate 20 to accurately position the read-out transducer head 22 with respect to tape 43 and sprocket wheel 18.

To achieve the necessary freedom of tape movement and accuracy of tape positioning with respect to the recording and reading transducer heads, the clearance between idler wheels 71–72 and sprocket wheel 17, and between corresponding idlers 75–76 and sprocket wheel 18, should preferably be twice the thickness of the tape 43. As the idler wheel shafts 73 and 74 are adjustably mounted on slidable plate 20, the adjustment of clearance between the idler wheels and the sprocket wheel may readily be achieved by initially placing a double thickness of tape such as tape 43 around the sprocket wheel and between the idlers and then moving the idlers into firm engagement with the double thickness of tape, at which position the shafts 73 and 74 are securely locked by tightening set screw means (not shown). Similar adjustment is made of idlers 75 and 76 with respect to sprocket wheel 18. Thus, in the preferred embodiment of the invention, the tolerance of adjustment between the tape driving sprocket wheels 17 and 18 and their associated tape guiding idler wheels 71–72 and 75–76 is in the order of 0.004 inches plus or minus 0.0001 inches. Adherence to such precise tolerances and critical angles of tape guiding slots is necessary in order to achieve the high speed and accurate tape handling for which the apparatus of the invention is intended.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense. It is to be understood that as the apparatus of the invention is fully and completely reversible in operation, wherever one transducer has been referred to as the recording transducer and the other as the readout or playback transducer, these descriptions of each transducer apply equally to the other in that their functions may readily be interchanged and reversed depending upon the mode of operation chosen at any given time.

It is also to be understood that the following claims are intended to cover all of the generic and specific features of the invention which, as a matter of language, might be said to fall therebetween.

I claim:

1. A buffer storage tape handling apparatus comprising in combination:

A. a pair of adjacent, separately operable, motor driven sprocket wheels each having associated therewith a magnetic transducer head adapted either for recording or reading data signals in a plurality of parallel tracks on a magnetic tape passed therebetween;

B. a pair of free running tape guide rollers adjacent and substantially tangent to each of said motor driven sprocket wheels, but spaced therefrom by a distance approximately equal to twice the thickness of tape to be passed therebetween;

C. a first and second pair of linear tape guiding slots, each said pair of slots adjacent one of said motor driven sprocket wheels;

1. the width of each said slot being approximately equal to twice the thickness of tape to be passed therethrough;

2. each said slot aligned with the space between one of said motor driven sprocket wheels and one of said free running rollers, the axis of said slot being substantially tangential to said roller and said sprocket wheel, whereby tape introduced into a first one of said slots is guided thereby through the space between one of said sprocket wheels and one of said adjacent rollers into tangential engagement with said one sprocket wheel.

2. A buffer storage tape handling apparatus according to claim 1 including a first pressure sensitive electrical switch located between said first and second pairs of linear tape guiding slots and positioned to be operated by a tight loop of tape passing from said first pair of slots into said second pair of slots.

3. The combination of claim 2 and a second pressure sensitive switch adapted to be operated by a second tight loop of tape externally of said guide slots and sprocket wheel driving means.

4. The combination of claim 2 in which said first pressure sensitive switch is adapted to cause operation of one of said sprocket wheel drives while inhibiting the recording of data signals by the magnetic transducer associated with said sprocket wheel.

5. The combination of claim 3 in which said second pressure sensitive switch is adapted to interrupt operation of one of said sprocket wheel drives while inhibiting the recording of data signals by the magnetic transducer associated with said sprocket wheel.

6. A magnetic tape transport according to claim 1 wherein the angle *a* which said first and fourth tape guide slots, of said first and second pair of linear slots, form with a central line bisecting either of said sprocket wheels and its associated magnetic transducer is of the order of 25 to 30°.

7. A magnetic tape transport according to claim 1 wherein the angle *b* which said second and third tape guide slots, of said first and second pair of linear slots, form with a central line bisecting either of said sprocket wheels and its associated magnetic transducer is less than 30°.

8. A magnetic tape transport as defined in claim 7 wherein said angle *a* is approximately 28 ½° and said angle *b* is approximately 28°.

9. The combination of claim 1 wherein the arcuate angle *c* subtended between the points of tangency of each said pairs of rollers with its adjacent sprocket wheel is of the order of 120° to 130°.

10. The combination of claim 1 wherein the angle *c* is approximately 124°.

11. In an incremental tape transport apparatus, means for reversibly feeding and guiding a continuous loop of magnetic tape past first and second transducer heads, comprising in combination:

A. a first sprocket wheel tape drive tangential to the first transducer head;

B. a first linear tape guide slot having one end thereof adjacent to the periphery of said first sprocket wheel at a first point, and the opposite end thereof opening into a tape storage chamber;

1. the axis of said first linear tape slot being substantially tangential to said sprocket wheel at said first point and forming a first acute angle with a line normal to the line of tangency between said sprocket wheel and the first transducer;

C. a second linear tape guide slot having a first end thereof adjacent to the periphery of said first sprocket wheel at a second point, and the opposite end thereof opening into said tape storage chamber;

1. the axis of said second linear tape guide slot being substantially tangential to said first sprocket wheel at said second point and forming a similar but opposite acute angle with a line normal to the line of tangency between said sprocket wheel and the first transducer;
2. the angle between said first and second tape guide slots limiting the extent of contact with said first sprocket wheel of tape passed therethrough to an arc of substantially less than 180°;

D. a second sprocket wheel tape drive tangential to the second transducer head;

E. a third linear tape guide slot having a first end thereof adjacent to the periphery of said second sprocket wheel at a first point and the opposite end thereof opening into said tape storage chamber in proximity to the opposite end of said second linear tape guide slot, whereby a buffer loop of tape may be formed between said opposite ends of said second and third tape guide slots;

1. the axis of said third linear tape guide slot being substantially tangential to said second sprocket wheel at said first point and forming an acute angle with a line normal to the line of tangency between said second sprocket wheel and the second transducer, and;

F. a fourth linear tape guide slot having a first end thereof adjacent to the periphery of said second sprocket wheel at a second point, and the opposite end thereof opening into said tape storage chamber;

1. the axis of said fourth tape guide slot being substantially tangential to said second sprocket wheel at said second point and forming a similar but opposite acute angle with a line normal to the line of tangency between said second sprocket wheel and the second transducer;
2. the angle between said third and fourth tape guide slots limiting the extent of contact with said second sprocket wheel of tape passed therethrough to an arc of substantially less than 180°.

12. The combination of claim 11 wherein said first and third tape guide slots are substantially parallel to each other, and said second and fourth tape guide slots are substantially parallel one to another.

13. The combination of claim 11 and a pair of free running tape guide rollers adjacent each of said first and second sprocket wheels at said first and second points of substantial tangency of the axes of said tape guide slots with the peripheries of said sprocket wheels.

14. The combination of claim 11 including a pressure sensitive switch located between the opposite ends of said second and third tape guide slots, said switch operable by tape passing between said slots whenever tape tension therebetween exceeds a predetermined limit.

15. The combination of claim 14 and a second pressure sensitive switch located in the tape storage chamber and operable by tape passing thereover whenever tape tension exceeds a predetermined limit.